United States Patent [19]
Hong

[11] Patent Number: 5,179,446
[45] Date of Patent: Jan. 12, 1993

[54] RADIO TRANSMITTING AND RECEIVING CIRCUITS OF A VIDEO CAMERA HAVING A DETACHED VIEW FINDER

[75] Inventor: Kwon-pyo Hong, Kyunggi, Rep. of Korea

[73] Assignee: SamSung Electronics Co., Ltd., Suwon, Rep. of Korea

[21] Appl. No.: 780,242

[22] Filed: Oct. 22, 1991

[51] Int. Cl.⁵ .............................................. H04N 5/30
[52] U.S. Cl. .................................. 358/224; 358/210; 358/209; 354/219
[58] Field of Search ............... 358/210, 224, 209, 164, 358/93; 354/82, 81, 219, 223

[56] References Cited

U.S. PATENT DOCUMENTS

| | | | |
|---|---|---|---|
| 3,984,625 | 10/1976 | Camras | 358/83 |
| 4,420,773 | 12/1983 | Toyada et al. | 358/235 |
| 4,541,698 | 9/1985 | Lerner | 354/82 |
| 4,672,436 | 6/1987 | Hawthorne | 358/93 |
| 4,714,959 | 12/1987 | Pshtissky | 358/184 |
| 5,040,072 | 8/1991 | Tsuji et al. | 358/228 |
| 5,079,634 | 1/1992 | Hosono | 358/210 |

FOREIGN PATENT DOCUMENTS

| | | |
|---|---|---|
| 61-159888 | 7/1986 | Japan . |
| 62-42674 | 2/1987 | Japan . |
| 63-142989 | 6/1988 | Japan . |
| 1-227580 | 9/1989 | Japan . |

Primary Examiner—Michael T. Razavi
Assistant Examiner—Tuan V. Ho
Attorney, Agent, or Firm—Bushnell, Robert E.

[57] ABSTRACT

Radio transmitting and receiving circuits are disclosed which operate wireless without interference and where the main body of a video camera is detached from the view finder. A timing controller applied to a radio transmitting circuit inserts an encoding signal into a video signal having a predetermined horizontal synchronizing signal interval. Meanwhile, a timing controller applied to a radio receiving circuit extracts the encoded video signal and supplies it to a decoder. The decoded signal is read in conjunction with a reference code signal in a code discriminator, and the received signal is displayed in the view finder only if the codes match.

8 Claims, 7 Drawing Sheets

FIG. 3A
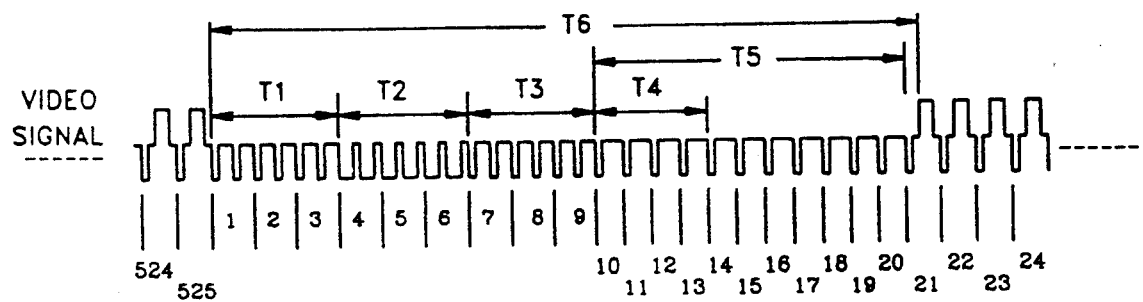
FIG. 3B
FIG. 3C
FIG. 3D
FIG. 3E
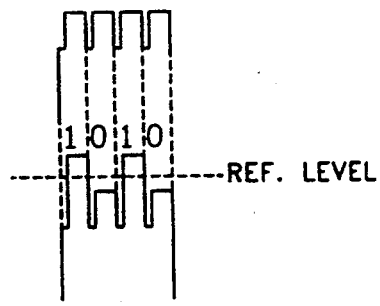

RADIO TRANSMITTING AND RECEIVING CIRCUITS OF A VIDEO CAMERA HAVING A DETACHED VIEW FINDER

BACKGROUND OF THE INVENTION

The present invention relates to a video camera wherein a view finder is detached from the main body, and more particularly to radio transmitting and receiving circuits provided in a video camera operated with detached main body and view finder sections.

Generally, a view finder of a video camera (or a camcorder) is integrated with the main body of the video camera and is operated and supported within a common housing. An alternative is the detached video camera disclosed in U.S. Pat. No. 4,541,698 by Lerner, where the view finder is detached from the video camera's main body which is mounted somewhere on the user's body, but connected via wires. However, since this is not wireless, photographing in inconvenient places, i.e., under water or in corners, is limited by such cramped spaces, rendering the video camera inconvenient to use. In addition to this, U.S. Pat. No. 4,672,436 by Hawthorn discloses a radio transmitter/receiver in which the detached view finder and the main body of the video camera can communicate with each other by radio, but does not teach a technique for processing the video signal without interference.

SUMMARY OF THE INVENTION

It is an object of the present invention to solve the above problems and to provide a radio transmitting circuit and a radio receiving circuit provided in a VCR in the main body and the view finder, respectively, which are detached and operated by radio.

It is another object of the present invention in a VCR to provide a radio transmitting circuit for transmitting a digital coding signal set by a user which is superposed on a video signal by applying a coding technique, and a radio receiving circuit for receiving the video signal only if the digital coding signal equals a value stored in the view finder, so as to prevent interference of operating signals between video cameras operated by radio signals.

To achieve the above objects of the present invention, there is provided a radio transmitting circuit which is installed in the main body of a video camera having a detached view finder, the circuit including:

- a charge-coupled device (CCD) portion for converting an image signal of an object input through a lens of the video camera installed in the main body of the video camera into an electrical video signal;
- a preprocessor for receiving the electrical signal to perform an automatic white balance control, an automatic black balance control, a flare compensation, and a gamma compensation;
- a video signal processor for receiving the proprocessed signal, separating the signal into a luminance signal and a color difference signal, and outputting a composite video signal;
- a synchronous signal separator for separating the composite video signal output from the video signal processor into vertical and horizontal synchronizing signals;
- code device for encoding a code set through a keypad by a user;
- a timing controller for receiving the signal output from the code device and overlapping the code signal on a predetermined horizontal synchronizing signal interval within the horizontal synchronizing signal separated from the synchronous signal separator;
- a mixer for mixing the overlapped signal of the timing controller and the video signal of the video signal processor;
- a modulating portion for receiving the mixed signal from the mixer and modulating the received mixed signal by a carrier of a specific frequency; and
- a transmitting portion for amplifying the modulated video signal of the modulating portion in an amplifier and then transmitting the amplified signal to the view finder through a transmitting antenna by radio.

Also, to achieve the above objects of the present invention, there is provided a radio receiving circuit in which the view finder is detached from the main body of the video camera, and installed in the view finder of the video camera having a detached view finder, the circuit, including:

- a receiving portion for receiving through a receiving antenna the composite video signal transmitted by radio from the main body of the video camera;
- a demodulator for amplifying the receiving signal supplied from the receiving portion and detecting the amplified signal;
- a video signal processor for processing the detected composite video signal supplied from the demodulator;
- a synchronous signal separator for separating the composite video signal into vertical and horizontal synchronizing signals;
- a timing controller for extracting the code signal overlapped on the predetermined horizontal synchronizing signal interval within the horizontal synchronizing signal detached in the synchronous signal separator;
- decoder for comparing and discriminating the decoded signal of the code signal supplied from the timing controller with the code set through the keypad by a user;
- a gating portion for passing or stopping the video signal supplied from the video signal processor in response to the signal supplied from the decoder; and
- a display portion for receiving the video signal from the gating portion, amplifying the received video signal, separating a synchronizing signal, and then displaying the video signal on the screen of the view finder.

BRIEF DESCRIPTION OF THE DRAWINGS

The above objects and other advantages of the present invention will become more apparent by describing the preferred embodiments of the present invention with reference to the attached drawings, in which:

FIGS. 3A through 3E are waveform diagrams for explaining the encoding operation of the radio transmitting circuit of a video camera having a detached view finder according to the present invention, which show waveform diagrams of part of a TV broadcasting signal, a separated vertical synchronizing signal, a delayed and waveform-transformed synchronizing signal used as a gate pulse, a separated horizontal synchronizing pulse, and an encoded horizontal synchronizing pulse, respectively;

DETAILED DESCRIPTION OF THE INVENTION

Figure 1:
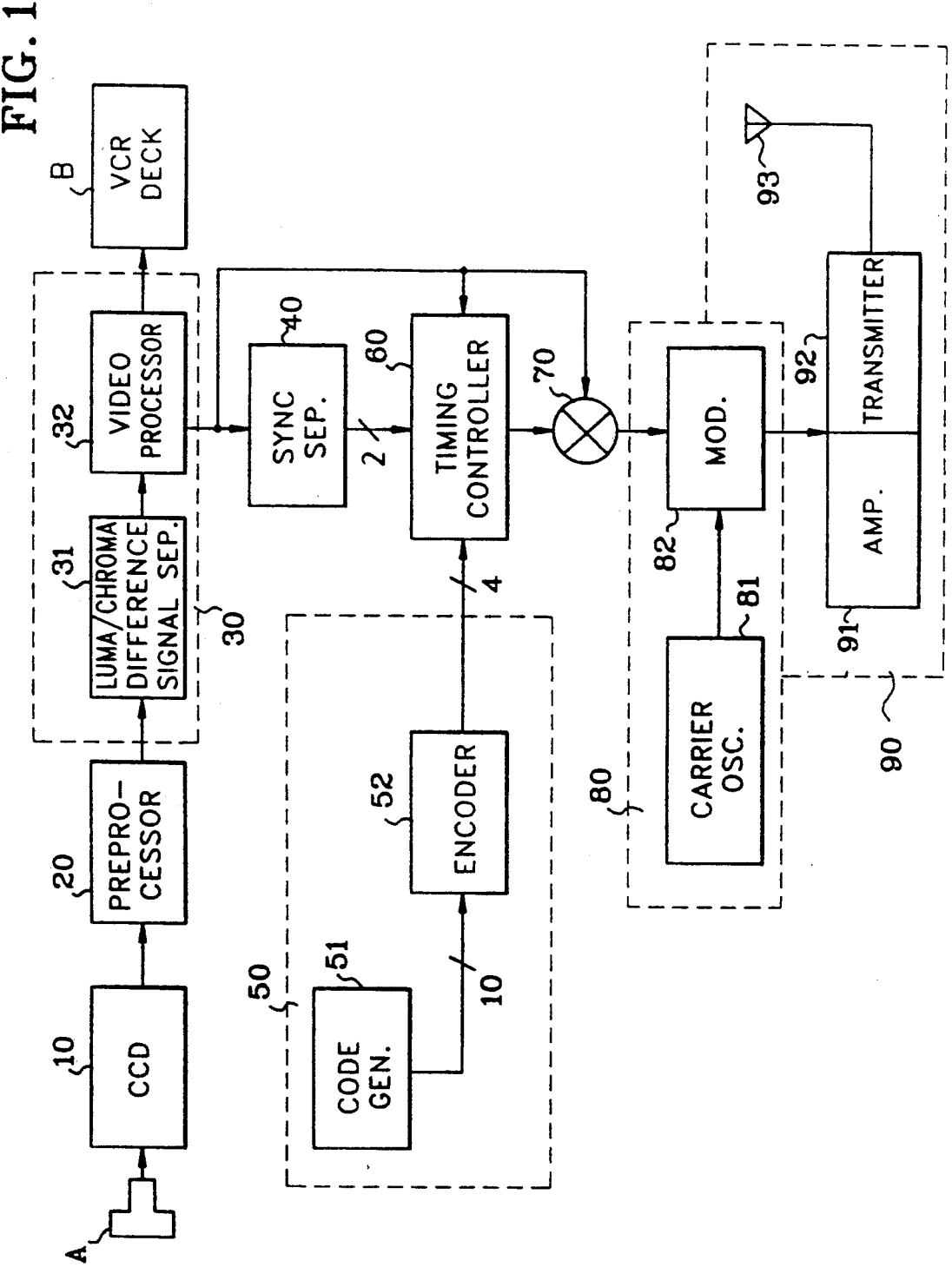
FIG. 1 is a block diagram showing the constitution of a radio transmitting circuit adapted to the main body of a video camera according to the present invention.

Referring to FIG. 1, a light reflected from an object passes through a camera lens portion A of a video camera. At this time, the light entering camera lens portion A is controlled by an automatic focusing driver, an automatic iris driver, and a shutter (not shown) and then is converted into an electrical video signal by a charge-coupled device 10 which is an image pickup device. The converted output signal is processed in a preprocessor 20 by an automatic white balance control, an automatic black balance control, a flare compensation, and a gamma compensation, and supplied to a video signal processor 30 to be separated into a luminance signal and a color difference signal and output as a video signal which includes a composite synchronizing signal. The processed video signal is transmitted with the composite synchronizing signal directly to a VCR deck B to be recorded or reproduced. At this time, an audio signal is also supplied to the VCR deck B through a microphone (not shown) to be recorded. The aforementioned video signal processing technique used in the present invention is already well-known, and accordingly, a detailed description is omitted.

Hereinafter, a process will be described in detail. In this process, video signals are transmitted/received wireless from the main body of a video camera to the screen of the view finder, in the video camera having a detached view finder and which is the gist of the present invention.

The video signal supplied from the video signal processor 30 is supplied to a synchronous signal separator 40 to be separated into vertical and horizontal synchronizing signals and then supplied to the timing controller 60. Meanwhile, within a code means 50, a user can input a secret number through numbered keys (0-9) and other function keys using a code generator 51 which includes a keypad. Accordingly, the code generator 51 generates a digital signal corresponding to the entered secret number. The digital signal is input to an encoder 52 to be encoded (also within code means 50), and then is supplied to the timing controller 60. Encoder 52 is a 10-to-4 bit coder which encodes a decimal digit from code generator 51, converting it into 4-bit digital data. The timing controller 60 overlaps the digital data signal supplied from the code means 50 on a horizontal synchronizing signal interval corresponding to 10H-13H (where 10H is the tenth horizontal scanning line and 13H is the thirteenth horizontal scanning line) within the character signal insertion interval of the horizontal synchronizing signal separated in the synchronous signal separator 40 and if each horizontal synchronizing pulse is greater than a reference pulse, it acts as a high, and if it is lower than the reference pulse, it acts as a low. The overlapped signal from the timing controller 60 is supplied to a mixer 70 along with the signal directly from video signal processor 30, i.e., the video signal in which the synchronizing signal has not been separated. These two signals are mixed in mixer 70 and then supplied to a modulating portion 80. The mixed signal is modulated in modulator 82 by means of a carrier of a specific frequency of a carrier oscillator 81 within modulating portion 80. The modulator 82 uses a balanced modulator or some other type of amplitude modulator. The modulated video signal from modulator 80 is amplified through an amplifier 91 and transmitted via a transmitter 92 and a transmitting antenna 93, which together constitute a transmitting portion 90, and ultimately received by the view finder by way of a wireless link.

Figure 2:
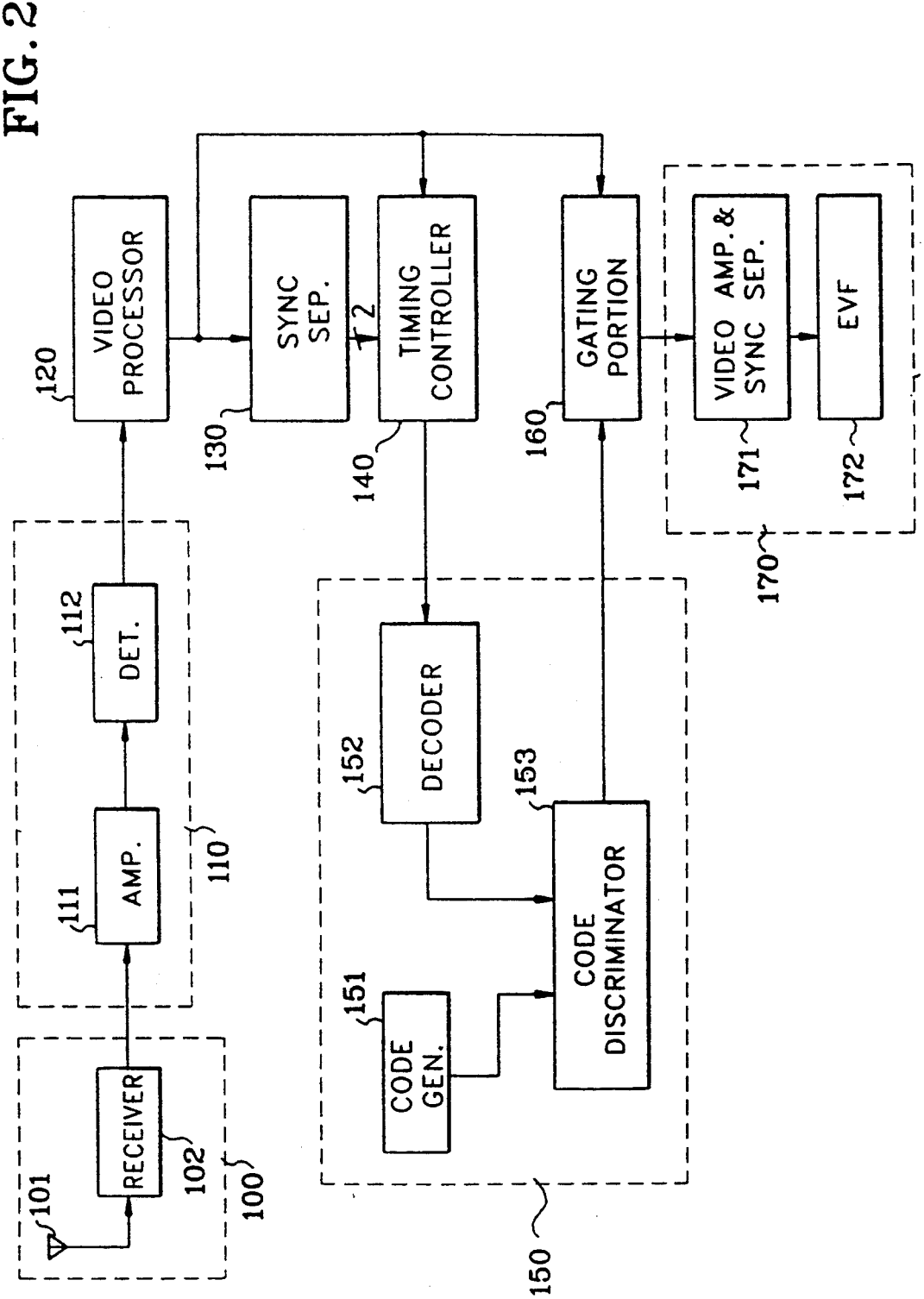
FIG. 2 is a block diagram showing the constitution of a radio receiving circuit adapted to the view finder of a video camera according to the present invention.

Referring to FIG. 2, the signal radiated wireless from transmitting portion 90 of the radio transmitting circuit adapted to the main body of the video camera, is received in receiving portion 100 adapted to the view finder of the video camera, which is composed of a receiving antenna 101 and a receiver 102. The received signal is supplied to a demodulator 110 in which the signal is amplified through an amplifier 111 and is detected in a detector 112. The detected video signal from demodulator 110 is supplied to a video signal processor 120 and processed therein. Here, the particular demodulator used determines whether the detector type employed as detector 112 is a synchronous or nonsynchronous detector. This composite video signal processed in the video signal processor 120 is supplied to a synchronous signal separator 130 to be separated into vertical and horizontal synchronizing signals which are input to a timing controller 140 together with the composite video signal. The timing controller 140 extracts the 4-bit digital signal loaded on the 10H-13H interval of the horizontal synchronizing signal which is within the character signal insertion interval of the first field in a horizontal synchronizing signal, and then supplies the extracted digital signal to a decoder 150. Meanwhile, the timing controller 140 extracts the 4-bit digital signal loaded on the horizontal synchronizing signal and then supplies the extracted signal to the decoding means 150. The timing controller 140 extracts a 4-bit digital signal loaded on the 273H-276H interval of the horizontal synchronizing signal of a second field. The extracted 4-bit digital signal is supplied to the decoder 152 within the decoder 150 and then, in the code discriminator 153, is compared with and discriminated against the code generated from the code generator 151 which includes a keypad. As the result of being decoded and discriminated in the decoding means 150, when the code from the code generator 151 equals the signal from the decoder 152, a logic high is output to the gating portion 160, thereby enabling the video signal supplied from the video signal processor 120 to the gating portion 160 to be fed to a display portion 170 to be displayed. Here, display portion 170 consists of a video amplifier and synchronous signal separator 171 for receiving and amplifying the video signal supplied from gating portion 160 and separating the synchronizing signals, and an electronic view finder (EVF) 172. When the code from the code generator 151 does not match the signal from the decoder 152, a low logic signal is input to the gating portion 160 to cut-off the video signal supplied from the video signal processor 120, so that the image is not displayed in the EVF 172.

Hereinafter, the operations of the radio transmitting and receiving circuits of the video camera having a detached view finder and constituted as above, will be described.

FIGS. 3A, 3B, 3C, 3D, and 3E show waveform diagrams of a signal illustrating part of a TV broadcasting signal, a separated vertical synchronizing signal, a delayed and waveform-converted synchronizing signal as a gate pulse, a detached horizontal synchronizing pulse, and an encoded horizontal synchronizing pulse, respectively. These waveform diagrams serve to explain the encoding operation of the radio transmitting circuit of the video camera having a separated view finder according to the present invention.

First of all, the present invention uses a part of the horizontal synchronizing signal interval detached in the synchronous signal separator 40 of FIG. 1. Referring to FIG. 3A, a TV broadcasting signal has 525 scanning lines per scanned frame, while being divided into two fields for each frame. At the beginning, equalizing pulses T1 and T3 correspond to the 1H-3H and the 7H-9H intervals of the first field, respectively. The 4H-6H interval T2 corresponds to the vertical synchronizing pulse. Also, the 10H-20H interval T5 is where a multiple character data signal can be inserted. The interval where the character signal is inserted in the following second field is from 273H-283H. Thus, as shown in FIG. 3A, the vertical blanking interval of the signal with respect to one field of a TV broadcasting signal, consists of a 3H equalizing pulse interval T1, a 3H vertical synchronizing signal pulse interval T2, another 3H equalizing pulse interval T3, a 10H-20H character signal insertion interval T5, and other video signal intervals. As for the timing of the second field, the vertical blanking starting point is delayed by 0.5H with respect to the first field. That is, it starts at 263H.

The timing controller 60 of the radio transmitting circuit shown in FIG. 1 uses the 10H-13H interval T4 within character signal insertion interval T5 to overlap the signal encoded through code means 50. Concurrently, timing controller 140 of the radio receiving circuit shown in FIG. 2 extracts and decodes the data loaded in that interval T4, and checks whether it equals the preset code in the decoder 150 of FIG. 2. This is the function which prevents radio interference by discriminating a cryptic number. The picture is displayed on EVF 172 only if the codes match.

Meanwhile, the vertical and horizontal synchronizing signals separated in the synchronous signal separator 40 are supplied to the timing controller 60 (FIG. 1). As shown in FIGS. 3B and 3C, the timing controller 60 delays the vertical synchronizing signal by 6H and produces a gate pulse signal whose pulse width is increased from 3H to 4H, thereby extracting only the 10H-13H portion of the video signal input to the timing controller 60.

Then, a key signal is generated from the code generator 51 which includes a keypad and is input to encoder 52. Encoder 52 is a 10-to-4 bit coder in which the entered code becomes a parallel 4-bit digital signal to be supplied to the timing controller 60. According to the 4-bit digital signal composed of "1" and "0's" input to timing controller 60, the 10H-13H pulse width of the horizontal synchronizing signal extracted in 1H units from the least significant bit (LSB) to the most significant bit (MSB) is either incremented or maintained.

Here, as shown in FIGS. 3D and 3E, when the 4-bit digital signal is "1", the pulse width of 10H-13H horizontal synchronizing signal is increased, and when it is "0", a converting step is carried out while retaining the original value, and then a pulse amplitude modulated (PAM) signal is output. As shown in FIG. 1, after the PAM signal is mixed with the video signal in the mixer 70, it is amplitude modulated in the balanced modulating portion 80 and is amplified through the transmitting portion 90 to be transmitted from the transmitting antenna 93 to the view finder.

On the view finder side (FIG. 2), receiving portion 100 receives the transmitted radio wave from the main body of the video camera through receiving antenna 101. The receiving portion uses a fixed receiving tuner tuned to a predetermined frequency. After the received signal is amplified and detected through demodulator 110 and processed in video signal processor 120, synchronous signal separator 130 separates the vertical and horizontal synchronizing signals from the composite video signal. Then, both synchronizing signals and the video signal are input to the timing controller 140. Like the timing controller 60 in the radio transmitting circuit in the main body of the video camera, timing controller 140 delays the vertical synchronizing signal by 6H and produces a gate pulse whose width is increased to 4H, thereby extracting the 10H-13H interval of the horizontal synchronizing signal from the horizontal synchronizing signal input to the timing controller 140. This extracted signal is supplied to the decoder 152 of decoder 150. Decoder 152 sets a midpoint voltage between the levels of the logic "1's" and the logic "0's" in the 10H-13H interval T4 as a reference voltage, then detects the logic levels encoded onto interval T4. At this time, if the level of the horizontal synchronizing signal is greater than the reference voltage, a logic "1" is detected, and if it is lower, a "0" is detected. The detected data signal is converted back into a 10-bit digital signal in the same order i.e., from LSB to MSB, as was encoded in the transmitting circuit of the video camer's main body to be supplied to code discriminator 153. Meanwhile, if an identical code is entered into the code generator 151 of decoder 150 (which also includes a keypad), a 10-bit digital signal is input to the code discriminator 153. Discriminator 153 determines whether the user's entered code signal equals the code signal loaded on the input video signal. If the two coded signals match, an identification signal in the form of a logic high is supplied to the gating portion 160. The gating portion 160 thus enabled supplies a video signal to the EVF 172, thereby displaying a picture. Conversely, if the signals are not equal, the gating portion 160 cuts off the video signal, thereby automatically preventing interference with video signal input from other radio video cameras.

Figure 4B:
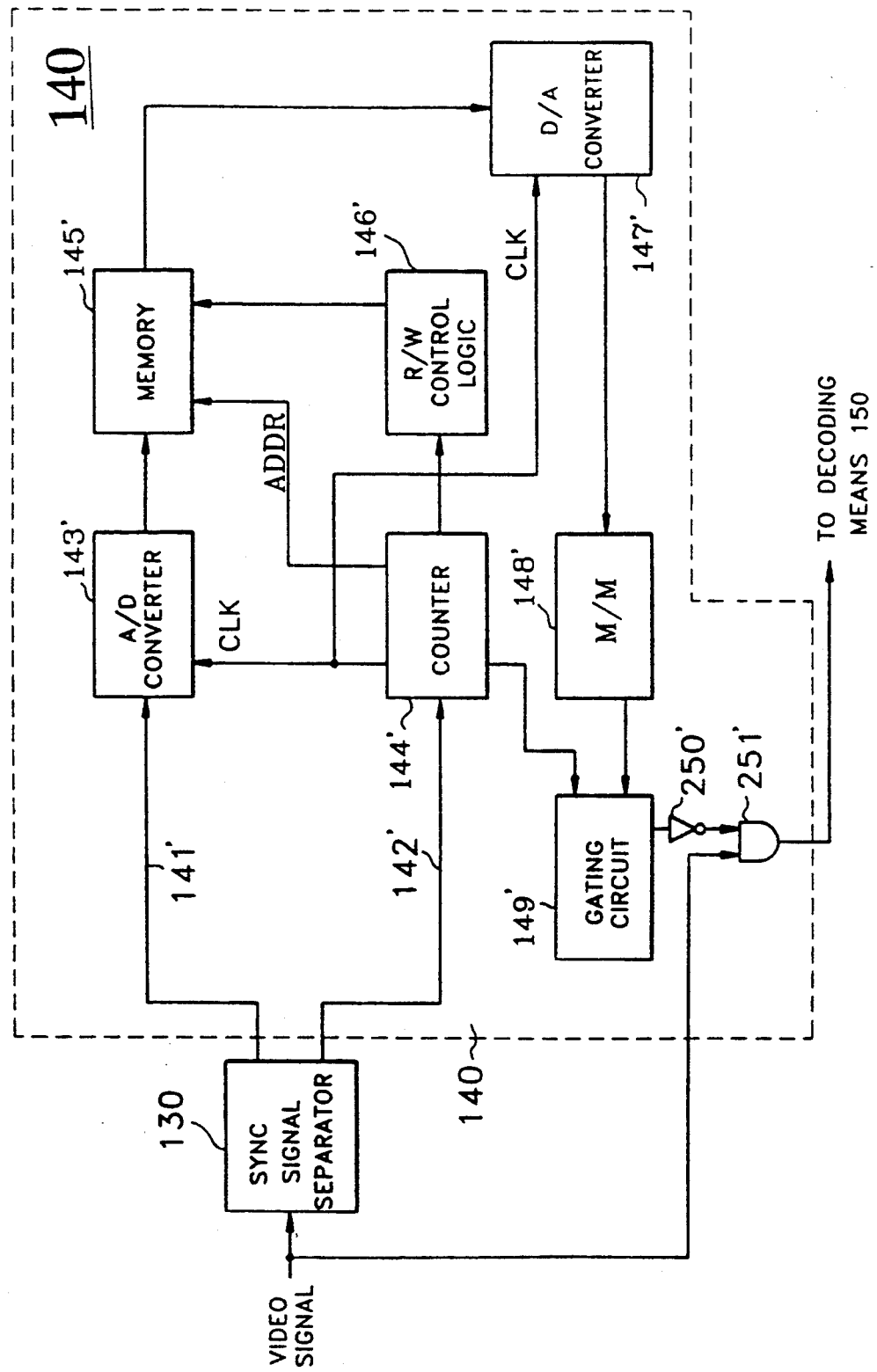
FIG. 4B is a detailed block diagram of the timing controller shown in FIG. 2.
Figure 4A:
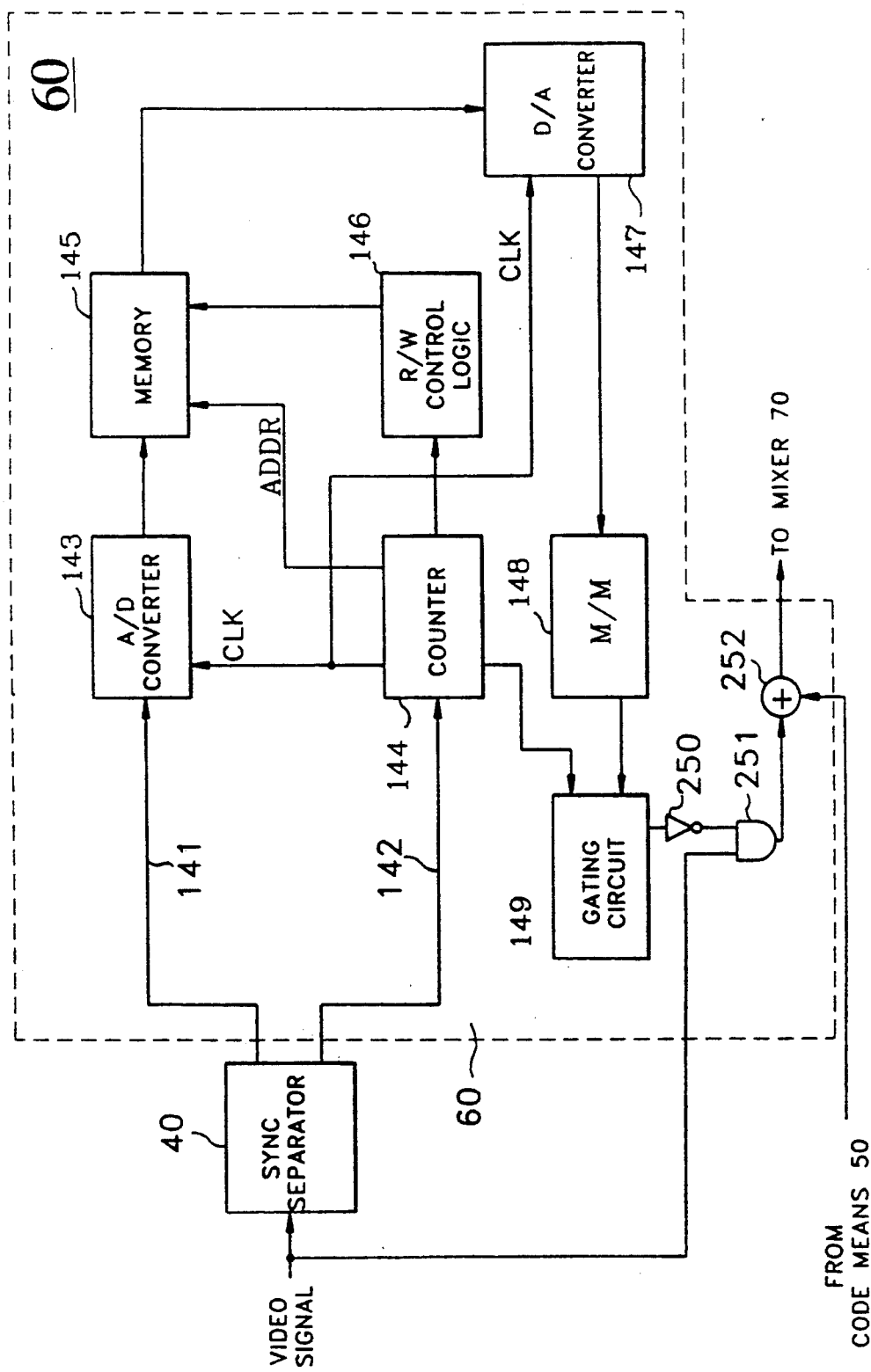
FIG. 4A is a detailed block diagram of the constitution of the timing controller shown in FIG. 1.

The internal constitution of the timing controllers of the transmitting and receiving circuits of the present invention is as follows. FIGS. 4A and 4B are detailed block diagrams of the constitutions of the timing controllers shown in FIGS. 1 and 2, respectively.

Referring to FIG. 4A, the vertical synchronizing signal 141 and the horizontal synchronizing signal 142 separated in the synchronous signal separator 40 are input to an analog to digital (A/D) converter 143 and a counter 144, respectively. At this time, the horizontal synchronizing signal includes an equalizing pulse, and two equalizing pulses are input as a horizontal synchronizing signal to the counter 144 to be counted. An output of the counter 144 provides a clock signal CLK to the A/D converter 143, thereby sampling the vertical synchronizing signal input to the A/D converter 143 to be converted into a digital signal. The digital signal is output to a memory 145 and stored in an address of memory 145 assigned by address signal ADDR from counter 144. Meanwhile, another output of the counter 144 is supplied to a read/write control logic portion 146 to write the signal in the 1H-6H interval and read from the 7H interval. The output of the read/write control logic portion 146 is supplied to memory 145 and reads the vertical synchronizing data written by the write signal in response to the read signal to be supplied to a D/A converter 147. In this case, a high logic signal can be directly output from counter 144 to memory 145 in the 1H to 6H interval, and a low logic signal can be directly output after the 7H interval. Next, the vertical synchronizing signal is input to the D/A converter 147 which receives the clock signal CLK from counter 144, and converts the vertical synchronizing signal into an analog signal. The converted vertical synchronizing signal is stretched to a 4H width by a monostable multivibrator (M/M) 148 and the stretched signal is supplied to one input terminal of gating circuit 149. An additional output of counter 144 is input into a second terminal of the gating circuit 149. The gating circuit 149 generates a gate pulse of the waveform shown in FIG. 3C. The gate pulse is inverted in an inverter 250 to be supplied to an AND gate 251. The AND gate 251 receives the output signal of the inverter 250 and the video signal and outputs the 10H-13H video signal of the horizontal synchronizing signal as shown in FIG. 3D. The 10H-13H video signal is added to the output of code means 50 in an adder 252, thereby supplying mixer 70 with a video signal loaded with coded information having the waveform shown in FIG. 3E.

Referring to FIG. 4B, the constitution and function of timing controller 140 adapted to the radio receiving circuit is very similar to those of timing controller 60 adapted in the radio transmitting circuit. In timing controller 140 of the radio receiving circuit, the output of AND gate 251' is directly supplied to decoder 150, and accordingly the 10H-13H interval interval horizontal synchronizing signal on which the cryptic code is loaded is discriminated with a reference code signal. The result of this discrimination is supplied to gating portion 160 of FIG. 2 and gates the video signal.

Figure 5:
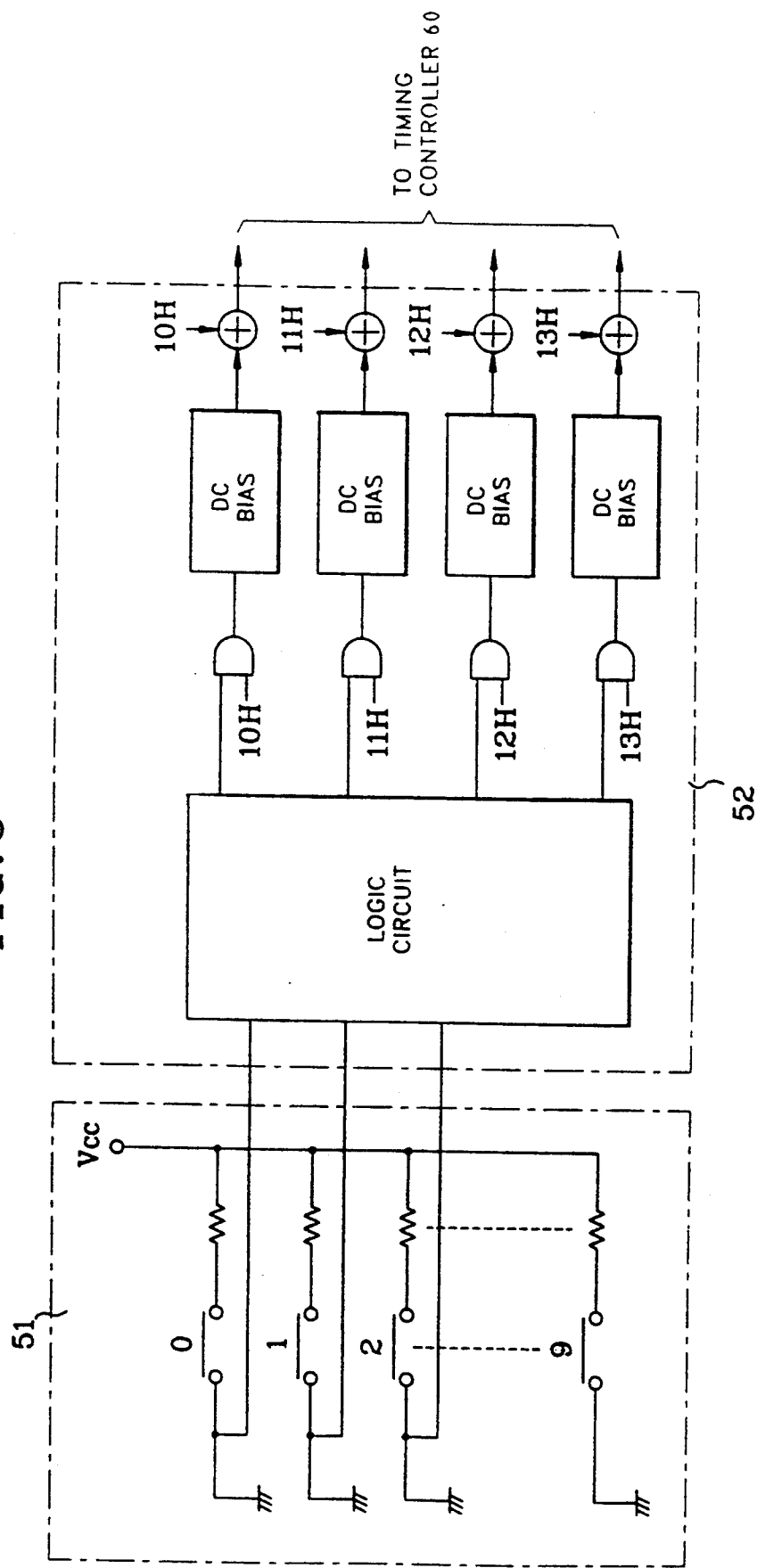
FIG. 5 is a detailed circuit diagram of the code means shown in FIG. 1.

Then, shown in FIG. 5 is a detailed construction of the code means 50 of FIG. 1 which includes a code generator 51 and an encoder 52.

Referring to FIG. 5, the user's key signal from the keypad of the code generator 51 in the transmitting circuit within the main body of the video camera, is a 10-bit digital signal and is converted into 4 bits by encoder 52 which includes a logic circuit. The respective converted digits are synchronized to the 10H to 13H pulses of the horizontal synchronizing signal to individually pass through the AND gates. If a logic high results, a direct current (dc) voltage is output by a dc bias circuit to be added to the 10H-13H pulses of the horizontal synchronizing signal in respective adders and to be supplied to timing controller 60. In the timing controller 60, a code signal from code device 50 is loaded onto the 10H-13H interval of the horizontal synchronizing signal of the video signal. Since the constitution and operation of decoder 152 and code generator 151 included in decoder 150 of the radio receiving circuit of the view finder according to the present invention is very similar to that of code device 50 of the above radio transmitting circuit, its detailed description will be omitted.

Figure 6:
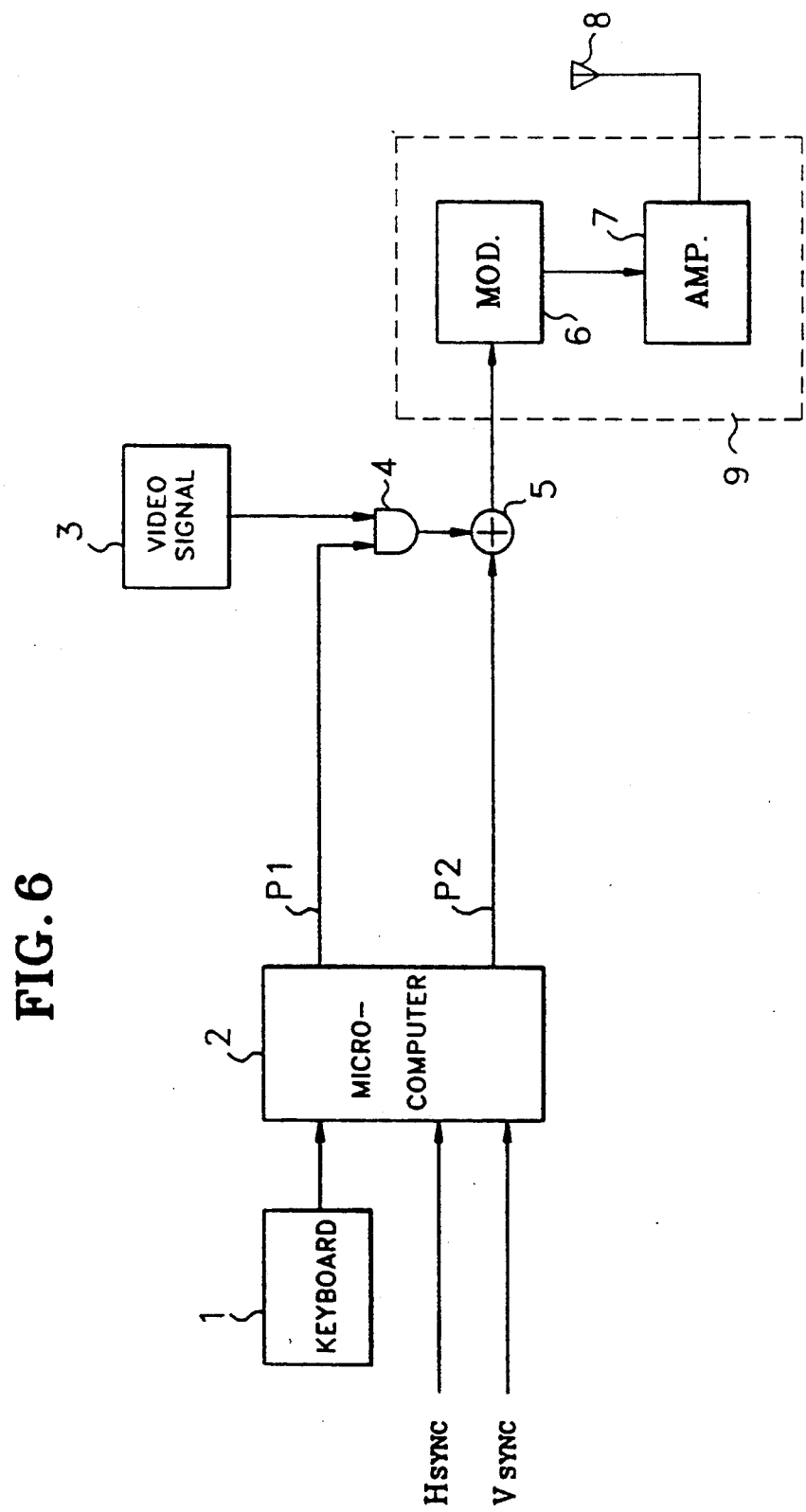
FIG. 6 is a diagram showing the constitution of another embodiment in which the radio receiving circuit of the view finder according to the present invention is realized using a microcomputer.

Also, the functions of the code generator, the decoder, the encoder, the code discriminator and the timing controller adapted to the radio transmitting and receiving circuits constituting the present invention can be duplicated by software installed in a microcomputer 2 shown in FIG. 6. FIG. 6 briefly shows the constitution of the radio transmitting circuit of the present invention using microcomputer 2.

Referring to FIG. 6, microcomputer 2 adds an encoding signal P2 to the 10H-13H interval of the horizontal synchronizing signal according to a key input from a keyboard 1 and uses the vertical synchronizing signal as a gate pulse P1 synchronized to the horizontal synchronizing signal. The vertical synchronizing signal is then gated with a TV video signal through a gating device 4. In an adder 5, the gated signal is added to the horizontal synchronizing signal which carries the encoding signal, then is modulated through a modulator 6 and an amplifier 7 in a modulating portion 9 to be transmitted through a transmitting antenna 8. The above brief description omits detailed discussion of the constitution and flowchart of the microcomputer used in the present invention. However, the scope of the present invention is the same as previously described.

As described above, according to the present invention, the radio transmitting and receiving circuits of the video camera having a detached view finder are applied to a video camera and can photograph with a detached main body and view finder in the places where the photographing is difficult or where space is limited. Also, so as not to be interfered with by a video signal from another radio video camera, a cryptic code can be easily set by the user through a keypad.

What is claimed is:

1. A radio transmitting circuit which is installed in a main body of a video camera having a detached view finder, said circuit comprising:
 a charge-coupled device portion providing an electrical signal by converting an image signal of an object input through a lens of said video camera;
 a preprocessor providing a preprocessed signal by performing on the electrical signal an automatic white balance control, an automatic black balance control, a flare compensation, and a gamma compensation;
 a video signal processor providing a composite video signal by performing a luminance/color difference signal process on the preprocessed signal;
 a synchronous signal separator providing vertical and horizontal synchronizing signals from the composite video signal;
 code means for providing an encoded signal, said code means comprising a code generator generating a recognition code using digits 0 through 9 input through a keypad by a user, and an encoder encoding said recognition code from said code generator into the encoded signal;
 a timing controller providing an overlapped signal by overlapping the encoded signal with the horizontal synchronizing signal during a predetermined horizontal synchronizing signal interval;
 a mixer providing a mixed signal by mixing the overlapped signal and the composite video signal;

a modulating portion providing a modulated signal by modulating the mixed signal with a carrier of a specific frequency; and a transmitting poriton amplifying the modulated signal and transmitting the amplified signal at a radio frequency to said view finder through a transmitting antenna.

2. The circuit of claim 1, wherein said timing controller comprises:

a counter providing a first counter signal by counting equalizing pulses of the horizontal synchronizing signal;

a memory storing the vertical synchronizing signal in an assigned address in response to an address signal from the counter;

a read/write control logic portion providing a read/write control signal to the memory in dependence upon the first counter signal, to read/write the vertical synchronizing signal stored in the memory;

a monostable multivibrator providing a multivibrator signal by a predetermined delay of the vertical synchronizing signal received from said memory;

a first gate circuit providing a predetermined horizontal synchronizing signal by gating a second counter signal and the multivibrator signal;

a second gate circuit providing a second gate signal by gating an inverted said predetermined horizontal synchronizing signal and said composite video signal; and an adder providing an encoded horizontal synchronizing signal by adding the second gate signal to the encoded signal.

3. A radio transmitting circuit which is installed in a main body of a video camera having a detached view finder, said circuit comprising:

a charge-coupled device portion providing an electrical signal by converting an image signal of an object input through a lens of said video camera;

a preprocessor providing a preprocessed signal by performing on the electrical signal an automatic white balance control, an automatic black balance control, a flare compensation, and a gamma compensation;

a video signal processor providing a composite video signal by performing a luminance/color difference signal process on the preprocessed signal;

a synchronous signal separator providing vertical and horizontal synchronizing signals from the composite video signal;

code means for providing an encoded signal by encoding an input by a user through a keypad;

a timing controller providing an overlapped signal by overlapping the encoded signal with the horizontal synchronizing signal during a predetermined horizontal synchronizing signal interval, said timing controller comprising:

a counter providing a first counter signal by counting equalizing pulses of the horizontal synchronizing signal, a memory storing the vertical synchronizing signal in an assigned address in response to an address signal from the counter, a read/write control logic portion providing a read/write control signal to the memory in dependence upon the first counter signal, to read/write the vertical synchronizing signal stored in the memory, a monostable multivibrator providing a multivibrator signal by a predetermined delay of the vertical synchronizing signal received from said memory, a first gate circuit providing a predetermined horizontal synchronizing signal by gating a second counter signal and the multivibrator signal, a second gate circuit providing a second gate signal by gating an inverted said predetermined horizontal synchronizing signal and said composite video signal, and an adder providing an encoded horizontal synchronizing pulse by adding the second gate signal to the encoded signal;

a mixer providing a mixed signal by mixing the overlapped signal and the composite video signal;

a modulating portion providing a modulated signal by modulating the mixed signal with a carrier of a specific frequency; and a transmitting portion amplifying the modulated signal and transmitting the amplified signal at a radio frequency to said view finder through a transmitting antenna.

4. The circuit of claim 3, wherein said code means comprises:

a code generator generating the recognition code using digits 0 through 9 input through said keypad by the user; and an encoder encoding said recognition code from said code generator into the encoded signal.

5. A radio receiving circuit which is installed in a detached view finder of a video camera having a main body, said circuit comprising:

a receiving portion providing a received signal by receiving a radio frequency signal through a receiving antenna from the main body of said video camera;

a demodulator providing a demodulated signal by amplifying and detecting the received signal;

a video signal processor providing a processed video signal by processing the demodulated signal;

a synchronous signal separator providing vertical and horizontal synchronizing signals by separating the vertical synchronizing signal and the horizontal synchronizing signal from the processed video signal;

a timing controller extracting a code signal overlapped on a horizontal synchronizing signal during a predetermined horizontal synchronizing signal interval;

decoding means for providing a code discriminated signal by comparing and discriminating said code signal with a recognition code, said decoding means comprising:

a code generator providing the recognition code by generating the recognition code from digits 0 through 9 input by a user through a keypad, a decoder providing a decoder signal by decoding said code signal, and a code discriminator providing the code discriminated signal by comparing and discriminating the recognition code and the decoded signal;

a gating portion passing the processed video signal in dependence upon the decoded signal; and a display portion receiving the processed video signal from said gating portion, amplifying the processed video signal, separating a synchronizing signal from the amplified processed video signal, and displaying the amplified processed video signal on a screen of the view finder.

6. The circuit of claim 5, wherein said timing controller comprises:
   a counter providing a first counter signal by counting equalizing pulses of the horizontal synchronizing signal;
   a memory storing the vertical synchronizing signal in an assigned address in response to an address signal from the counter;
   a read/write control logic portion providing a read/write control signal to the memory in dependence upon the first counter signal, to read/write the vertical synchronizing signal stored in the memory;
   a monostable multivibrator providing a multivibrator signal by a predetermined delay of the vertical synchronizing signal received from said memory;
   a first gate circuit providing a predetermined horizontal synchronizing signal by gating a second counter signal and the multivibrator signal; and
   a second gate circuit providing the code signal by gating an inverted said predetermined horizontal synchronizing signal and said processed video signal.

7. A radio receiving circuit which is installed in a detached view finder of a video camera having a main body, said circuit comprising:
   a receiving portion providing a received signal by receiving a radio frequency signal through a receiving antenna from the main body of said video camera;
   a demodulator providing a demodulated signal by amplifying and detecting the received signal;
   a video signal processor providing a processed video signal by processing the demodulated signal;
   a synchronous signal separator providing vertical and horizontal synchronizing signals by separating the vertical synchronizing signal and the horizontal synchronizing signal from the processed video signal;
   a timing controller extracting a code signal overlapped on a horizontal synchronizing signal during a predetermined horizontal synchronizing signal interval, wherein said timing controller comprises,
   a counter providing a first counter signal by counting equalizing pulses of the horizontal synchronizing signal,
   a memory storing the vertical synchronizing signal in an assigned address in response to an address signal from the counter,
   a read/write control logic portion providing a read/write control signal to be memory in dependence upon the first counter signal, to read/write the vertical synchronizing signal stored in the memory,
   a monostable multivibrator providing a multivibrator signal with a predetermined delay of the vertical synchronizing signal received from said memory,
   a first gate circuit providing a predetermined horizontal synchronizing signal by gating a second counter signal and the multivibrator signal, and
   a second gate circuit providing the code signal by gating an inverted said predetermined horizontal synchronizing signal and said processed video signal;
   decoding means for providing a first decoded signal by comparing and discriminating the code signal with a recognition code set provided by a user through a keypad;
   a gating portion passing the processed video signal in dependence upon the first decoded signal; and
   a display portion receiving the processed video signal from said gating portion, amplifying the processed video signal, separating a synchronizing signal from the amplified processed video signal, and displaying the amplified processed video signal on a screen of the view finder.

8. The circuit of claim 7, wherein said decoding means comprises:
   a code generator providing the recognition code by generating the recognition code from digits 0 through 9 input by a user through a keypad;
   a decoder providing a decoder signal by decoding said code signal; and
   a code discriminator providing the code discriminated signal by comparing and discriminating the recognition code and the decoded signal.

* * * * *

UNITED STATES PATENT AND TRADEMARK OFFICE
CERTIFICATE OF CORRECTION

PATENT NO. : 5,179,446
DATED : January 12, 1993
INVENTOR(S) : Kwon-pyo Hong

It is certified that error appears in the above-indentified patent and that said Letters Patent is hereby corrected as shown below:

Column 12, line 8, preceding "memory" change "be" to -- the--.

Signed and Sealed this

Twelfth Day of September, 1995

Attest:

BRUCE LEHMAN

*Attesting Officer*  *Commissioner of Patents and Trademarks*